United States Patent
Johnson et al.

(10) Patent No.: US 7,463,407 B2
(45) Date of Patent: Dec. 9, 2008

(54) ELECTRO-OPTICALLY ACTIVE DEVICE

(75) Inventors: Mark Thomas Johnson, Eindhoven (NL); Alexander Victor Henzen, Heerlen (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 10/517,458

(22) PCT Filed: May 27, 2003

(86) PCT No.: PCT/IB03/02321

§ 371 (c)(1), (2), (4) Date: Dec. 8, 2004

(87) PCT Pub. No.: WO03/107086

PCT Pub. Date: Dec. 24, 2003

(65) Prior Publication Data

US 2006/0050378 A1   Mar. 9, 2006

(30) Foreign Application Priority Data

Jun. 13, 2002   (EP) ................... 02077333

(51) Int. Cl.
*G02B 26/00* (2006.01)
*G02F 1/1335* (2006.01)

(52) U.S. Cl. ...................... 359/296; 349/113

(58) Field of Classification Search ................. 359/296; 345/107, 105; 430/32, 34, 38; 204/600, 204/450; 349/113, 138; 257/59, 72, 258, 257/443

See application file for complete search history.

(56) References Cited

U.S. PATENT DOCUMENTS

| | | | |
|---|---|---|---|
| 5,745,094 A | 4/1998 | Gordon | |
| 6,144,361 A | 11/2000 | Gordon | |
| 6,337,761 B1 | 1/2002 | Rogers | |
| 6,639,580 B1 * | 10/2003 | Kishi et al. | 345/107 |
| 6,738,039 B2 * | 5/2004 | Goden | 345/107 |
| 6,873,451 B2 * | 3/2005 | Ukigaya | 359/296 |
| 6,900,924 B2 * | 5/2005 | Goden | 359/296 |

(Continued)

FOREIGN PATENT DOCUMENTS

EP   1306716   5/2003

(Continued)

OTHER PUBLICATIONS

Toko Y et al: "Display Performances of Mobile Fine Particle Display with Liquid Crystal" 2002 SID International Symposium Digest of Technical Papers. Boston, MA, May 21-23, 2002, SID International Symposium Digest of Technical Papers, San Jose, CA: SID US, vol. 33/ 1,21 May 2002.

*Primary Examiner*—Hung X. Dang
*Assistant Examiner*—Tuyen Q Tra
(74) *Attorney, Agent, or Firm*—Michael E. Belk

(57) ABSTRACT

The invention relates to an electro-optically active display device, comprising at least one individually addressable pixel, each pixel being provided with an obstructing element (3), such as a reservoir light shield, a black matrix or a mirror element. According to the invention, a portion of at least one component is positioned beneath the obstructing element in such a way that the portion is not visible for a viewer of the display device.

10 Claims, 1 Drawing Sheet

U.S. PATENT DOCUMENTS

| | | | |
|---|---|---|---|
| 6,987,502 B1 * | 1/2006 | Kishi et al. | 345/107 |
| 7,009,756 B2 * | 3/2006 | Kishi et al. | 359/296 |
| 7,034,987 B2 * | 4/2006 | Schlangen | 359/296 |
| 2002/0008898 A1 | 1/2002 | Katase | |

FOREIGN PATENT DOCUMENTS

| | | |
|---|---|---|
| GB | 1562653 | 3/1980 |
| JP | 01137240 A | 5/1989 |
| WO | WO 03019279 | 3/2003 |

* cited by examiner

ELECTRO-OPTICALLY ACTIVE DEVICE

The present invention relates to an improved electro-optically active display.

An electrophoretic display, being one example of an electro-optically active display where there is physical transport of the electro-optically active medium through the device, essentially comprises a suspension of coloured particles in a liquid having another colour than the above particles. The display may be driven in two states, a distributed state, in which the particles are distributed in a display cell in such a way that they essentially cover the cell area, and a collected state, in which the particles are collected in a chosen area of the cell, in order to affect the transmission of the cell in a small extent, if any. For the collection of particles, some electrophoretic displays comprises a reservoir part incorporated in the cell. The reservoir part comprises an obstructing light shield element, behind which the particles may be collected in said collected state, in such a way that the particles are not visible for a viewer. This solution has the drawback that said obstructing light shield element takes up a part of the cell area, and thereby limits the transmission of the cell, but on the other hand, the remaining active transmission area of the cell may be totally emptied on particles in the collected state, thereby offering good transmission characteristics in this state.

However, usually an electrophoretic display further comprises of a regular lateral array of electrophoretic cells, said array being driven by means of active matrix driving. Such active matrix driving requires a large number of components, which must be placed in each of the pixel cells, malting up the display. Examples of such components are spacers, gate and data lines, storage capacitors and TFTs. Since such components are placed in the cell, these will occupy a part of the active viewing and transmission area of the cell, thereby limiting the transmission of the cell. This is especially the case in electrophoretic transmissive or transflective displays, in which the electrophoretic layer is switched by lateral fields.

Hence, a problem with prior art displays is that a comparatively large area of the cell is occupied with a variety of components as stated above, which limits the transmission capabilities of the display.

Previously, some attempts have been made to solve the above problem, for example by making the components as small as possible or by making them essentially transparent, as suggested by U.S. Pat. No. 6,337,761. However, the components may still have a negative effect on the transmission through the active cell area, and therefore an improved display device, overcoming the above drawback, is desired.

Hence, the object of the present invention is to overcome at least some of the drawbacks with the prior art electrophoretic displays, and provide a display with improved transmission characteristics.

The above and other objects are achieved by the invention by an electrophoretic display device, comprising at least one individually addressable pixel, each pixel being provided with an obstructing element, being characterised in that a portion of at least one component, being one of an electrical or a mechanical component, is positioned beneath the obstructing element in such a way that the portion is not visible for a viewer of the display device. In this way, the maximum area of an active cell area is available for transmissive operation, and hence the transmission of the display device is improved.

Examples of the obstructing element are reservoir light shield, black matrix and mirror element.

Preferably, said at least one component is one of a spacer, a barrier a gate electrode, a data electrode, a storage capacitor or a thin film transistor, which are all components commonly present in current electrophoretic displays. However, many other components such as sensors for temperature etc. may in accordance with the invention also be positioned in the same way to achieve the same advantageous effects.

According to a preferred embodiment of this invention, said display is a reservoir electrophoretic display device, comprising a reservoir light shield, beneath which one or more of an electrode, a storage capacitor and a thin film transistor is positioned. In this case, the light shield is necessarily present in the cell, and by positioning other components beneath said light shield, the active transmission area of the cell may be maximised. Moreover, said pixel may further comprise a reflective element for enabling transflective operation, whereby a portion of an additional component, such as a source electrode is positioned beneath the reflective element, in such a way that it is not visible for a viewer of the display device. By covering source lines with the reflector, the area available for transmission is maximised, in the case of transflective operation.

This invention will hereinafter be described by means of presently preferred embodiments, with reference to accompanying drawings.

Figure 2:
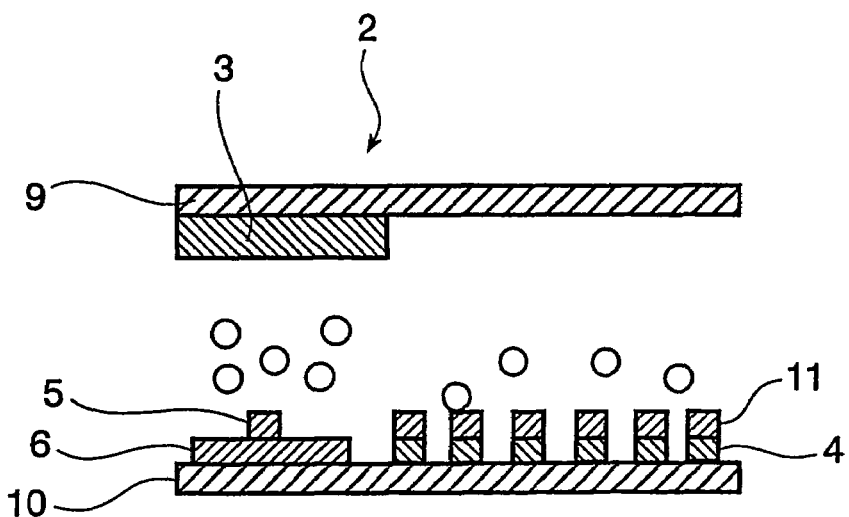
FIG. 2 is schematic cross-section of a reservoir electrophoretic display device in accordance with the invention.

This invention relates to an electrophoretic display device 1, for example as shown in FIG. 2, comprising a plurality of cells, each cell 2 comprising a suspension of charged coloured particles in a light-transmissive fluid. Each cell 2 essentially comprises a transmissive front substrate 2, a gate electrode 5, a source electrode 4 and a back substrate, being arranged to be reflective, transmissive or transflective (FIG. 2 shows a transflective device as an example). The arrangement of these components will be defined below. The cell further comprises a light shield element 3 in order to provide a reservoir part of the cell. The remaining part of the cell, not being covered by the light shield element 3, constitutes an active cell part. The display may be driven in two states, a collected state and a distributed state. In the distributed state, the electrodes 4, 5 are so driven that the particles of the suspension are distributed throughout the active cell part, so that light being transmitted through the cell in either direction are disturbed by the presence of said particles. In the collected state, the electrodes 4, 5 are so driven that the charged particles essentially are collected in the reservoir part of the cell, and thereby do not disturb the transmission of light through the active cell part. In order to achieve the desired characteristics of the light transmission in the distributed state, the pigmentation and colouring of the pigments and the light-transmissive fluid may be adjusted in accordance with prior art.

Figure 1:
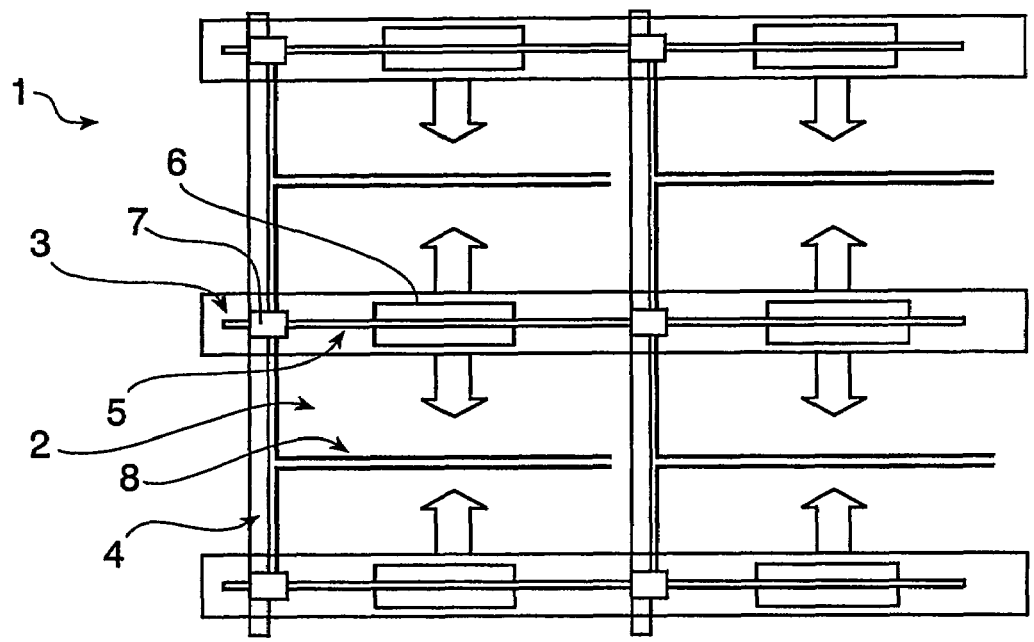
FIG. 1 is a plan view of a possible array layout in accordance with this invention.

FIG. 1 is a plan view of one possible embodiment of the invention. FIG. 1 discloses a part of an electrophoretic display active matrix array 1, comprising four cells. Each of said cells 2 is associated with a light shield 3 in order to provide a reservoir part of the cell. The display further comprises a source line 4 as well as a gate line 5. In accordance with the invention, the gate line 5 is positioned beneath the light shield 3, so that it is not visible for a viewer of the display. In this way, the gate line 5 do not occupy any extra space of the active cell part, and hence do not affect the transmission characteristics of the display. The source line 4 is in a known manner positioned essentially perpendicular to the gate line 5. Furthermore, the display cell comprises a TFT 8 (thin film transistor) and a storage capacitor 6, the combination of which is used to apply selected voltages to each individual pixel, by means of an addressing scheme as is commonly used in liquid crystal displays (LCDs) in accordance with prior art. Both the TFT and the storage capacitor are positioned beneath the light shield 3, so that they are not visible for a viewer of the display and hence do not occupy any extra space of the active cell part. By organising the above components in this way, the maximum area is available for transmissive operation of the display. The above configuration may moreover be used in any one of a reflective, transmissive or transflective display device. In the case or a transflective device, in which a part of the back substrate of the cell is provided with reflective element 11, as described above, it is further possible to position said source line 4 beneath the reflector (i.e. not visible for a viewer of the display element), and thereby maximise the area available for transmission.

The above configuration is especially suitable in transflective and transmissive electrophoretic displays using a lateral field in combination with the above reservoir function. Since the reservoir is an inactive area of the cell and shields everything in the affected area from view, essentially all electrical and mechanical components required for the display should preferably be placed behind said light shield defining the reservoir, thereby maximizing the transmission. Such components may for example include gate and source electrodes, TFTs, storage capacitors, spacers, barriers and sensors.

Alternatively, components of the above mentioned kind may be positioned behind other elements, such as under a black matrix or a mirror element, already present in the display structure.

Although this invention has been described with respect to specific embodiments, the details thereof are not to be construed as limitations, and many variations, modifications and alterations will be apparent for a man skilled in the art, and is intended to be included within the scope of this invention. As a specific example, the invention may not only be used in electrophoretic displays, but is equally applicable to other electro-optically active displays, which work on the principle that there is a physical transport of electro-optically active medium between a visible pixel area and a more or less hidden area. Other examples of such displays are electro-wetting displays, which utilises movement of coloured oil layers, and electromechanical displays, which utilises the movement of for example foils.

The invention claimed is:

1. Electro-optically active display device with physical transport of an electro-optically active medium through the device, comprising at least one individually addressable pixel, said pixel being provided with an obstructing element, wherein a portion of both a storage capacitor and a gate electrode is positioned beneath the obstructing element in such a way that the portion is not visible for a viewer of the display device.

2. The display device according to claim 1, wherein a portion of at least one component, being one of spacer or an electrical component other than the gate electrode and the storage capacitor, is positioned beneath the obstructing element in such a way that the portion of the at least one component is not visible for a viewer of the display device.

3. The display device according to claim 2, wherein a portion of at least two electrical components other than the storage capacitor and the gate electrode are positioned beneath the obstructing element.

4. The display device according to claim 1, wherein at least a portion of at least one component, being one of a sensor or a thin film transistor, is positioned beneath the obstructing element.

5. The display device according to claim 1, wherein said display is a reservoir electrophoretic display device, comprising a reservoir light shield, beneath which one or more of a sensor and a thin film transistor is positioned.

6. The display device according to claim 1, wherein said display is one of an electrophoretic display, an electro-wetting display or an electro-mechanical display.

7. The display device according to claim 1, wherein the obstructing element is arranged behind a front substrate.

8. The display device according to claim 1, wherein a portion of at least one of a spacer and an electrical component other than the storage capacitor and the gate electrode are positioned beneath the obstructing element.

9. A reservoir electrophoretic display device, comprising at least one individually addressable pixel, said pixel having a reservoir light shield, beneath which one or more of an electrode, a storage capacitor, a sensor, and a thin film transistor is positioned, said pixel further comprising a reflective element for enabling transflective operation, wherein at least a portion of a source electrode is positioned beneath the reflective element in such a way that the portion is not visible for a viewer of the display device.

10. The display device according to claim 9, wherein a portion of an additional component is positioned between a back substrate and the reflective element, in such a way that the portion of the additional component is not visible for a viewer of the display device.

* * * * *